United States Patent
Joseph et al.

(10) Patent No.: US 11,785,608 B2
(45) Date of Patent: Oct. 10, 2023

(54) TECHNIQUES FOR DOWNLINK CONTROL INFORMATION (DCI) FEEDBACK IN WIRELESS COMMUNICATIONS

(71) Applicant: QUALCOMM Incorporated, San Diego, CA (US)

(72) Inventors: Vinay Joseph, San Diego, CA (US); Piyush Gupta, Bridgewater, NJ (US); Mostafa Khoshnevisan, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/539,677

(22) Filed: Aug. 13, 2019

(65) Prior Publication Data
US 2020/0059908 A1 Feb. 20, 2020

Related U.S. Application Data

(60) Provisional application No. 62/719,473, filed on Aug. 17, 2018.

(51) Int. Cl.
*H04W 72/00* (2023.01)
*H04W 72/23* (2023.01)
(Continued)

(52) U.S. Cl.
CPC ........... *H04W 72/23* (2023.01); *H04L 1/0061* (2013.01); *H04W 24/08* (2013.01);
(Continued)

(58) Field of Classification Search
CPC ... H04W 72/042; H04W 76/25; H04W 76/11; H04W 76/27; H04W 24/08;
(Continued)

(56) References Cited

U.S. PATENT DOCUMENTS 10,021,679 B2 * 7/2018 Yokomakura ......... H04W 76/14
10,305,637 B2 * 5/2019 Kim ....................... H04L 1/1861
(Continued)

FOREIGN PATENT DOCUMENTS

WO 2017193347 A1 11/2017
WO 2018126401 A1 7/2018

OTHER PUBLICATIONS

How LTE Stuff Works?, RNTIs in LTE, 11 pages, http://howltestuffworks.blogspot.com/2014/06/rntis-in-lte.html, Dec. 2014 (Year: 2014).*
(Continued)

*Primary Examiner* — Mounir Moutaouakil
(74) *Attorney, Agent, or Firm* — ArentFox Schiff LLP

(57) ABSTRACT

Aspects described herein relate to receiving, from a base station, a configuration for sending downlink control information (DCI) feedback for a downlink control channel monitoring occasion, where the configuration indicates one or more of an uplink control channel resource and an uplink shared channel resource over which to send the DCI feedback. DCI can be received from the base station over the downlink control channel during the downlink control channel monitoring occasion. DCI feedback can be transmitted, based on receiving the DCI, to the base station over the one or more of the uplink control channel resource and the uplink shared channel resource indicated in the configuration.

27 Claims, 6 Drawing Sheets

(51) Int. Cl.
*H04W 76/25* (2018.01)
*H04W 76/11* (2018.01)
*H04W 76/27* (2018.01)
*H04L 1/00* (2006.01)
*H04W 24/08* (2009.01)
*H04W 72/044* (2023.01)
*H04W 72/53* (2023.01)

(52) U.S. Cl.
CPC ....... *H04W 72/0466* (2013.01); *H04W 72/53* (2023.01); *H04W 76/11* (2018.02); *H04W 76/25* (2018.02); *H04W 76/27* (2018.02)

(58) Field of Classification Search
CPC ......... H04W 72/0466; H04W 72/0493; H04W 72/085; H04W 72/0413; H04L 1/0061; H04L 1/16; H04L 5/0053; H04L 5/0094
See application file for complete search history.

(56) References Cited

U.S. PATENT DOCUMENTS

| | | | | |
|---|---|---|---|---|
| 11,139,926 | B2* | 10/2021 | Aiba | H04L 1/1861 |
| 11,283,551 | B2* | 3/2022 | Lee | H04L 5/00 |
| 2015/0139136 | A1* | 5/2015 | Zhang | H04L 5/0053 370/329 |
| 2015/0319643 | A1* | 11/2015 | Zhu | H04W 72/21 370/336 |
| 2016/0037524 | A1* | 2/2016 | Krzymien | H04L 1/1812 370/329 |
| 2017/0026997 | A1* | 1/2017 | Moulsley | H04L 1/001 |
| 2018/0295612 | A1* | 10/2018 | Yi | H04L 5/0053 |
| 2019/0082457 | A1 | 3/2019 | Zhou et al. | |
| 2019/0223205 | A1* | 7/2019 | Papasakellariou | H04L 5/00 |
| 2019/0306865 | A1* | 10/2019 | Medles | H04L 1/1825 |
| 2019/0363840 | A1* | 11/2019 | Wang | H04L 1/1861 |
| 2020/0008231 | A1* | 1/2020 | Vilaipornsawai | H04B 7/088 |
| 2020/0162212 | A1 | 5/2020 | Liu et al. | |
| 2020/0170033 | A1* | 5/2020 | Gao | H04L 1/0027 |
| 2020/0252978 | A1* | 8/2020 | Yi | H04W 72/0453 |
| 2021/0135791 | A1* | 5/2021 | Wang | H04L 1/0067 |
| 2021/0194622 | A1* | 6/2021 | Takeda | H04L 1/0005 |
| 2021/0329682 | A1* | 10/2021 | Takeda | H04W 72/535 |
| 2022/0173841 | A1* | 6/2022 | Lee | H04W 72/23 |

OTHER PUBLICATIONS

International Search Report and Written Opinion—PCT/US2019/046514—ISA/EPO—dated Oct. 23, 2019.

* cited by examiner

TECHNIQUES FOR DOWNLINK CONTROL INFORMATION (DCI) FEEDBACK IN WIRELESS COMMUNICATIONS

CLAIM OF PRIORITY UNDER 35 U.S.C. § 119

The present Application for Patent claims priority to Provisional Application No. 62/719,473, entitled "TECHNIQUES FOR DOWNLINK CONTROL INFORMATION (DCI) FEEDBACK IN WIRELESS COMMUNICATIONS" filed Aug. 17, 2018, which is assigned to the assignee hereof and hereby expressly incorporated by reference herein for all purposes.

BACKGROUND

Aspects of the present disclosure relate generally to wireless communication systems, and more particularly, to facilitating communicating feedback for wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

Some 5G deployments have stringent latency and reliability requirements, such as industrial internet-of-things (IoT) with URLLC deployments, which can require, for example, less than one millisecond latency and $10^{-6}$ reliability (which can be measured as a block error rate or packet error rate, etc.). In such deployments, it can be important that a downlink control channel, which carries resource grants, comply with the reliability requirements to ensure effective communications in the deployed network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided. The method includes receiving, from a base station, a configuration for sending downlink control information (DCI) feedback for a downlink control channel monitoring occasion, wherein the configuration indicates one or more of an uplink control channel resource and an uplink shared channel resource over which to send the DCI feedback, receiving, from the base station, DCI over the downlink control channel during the downlink control channel monitoring occasion, and transmitting, based on receiving the DCI, DCI feedback to the base station over the one or more of the uplink control channel resource and the uplink shared channel resource indicated in the configuration.

In another example, a method for wireless communications is provided. The method includes transmitting, to a user equipment (UE), a configuration for sending DCI feedback for a downlink control channel monitoring occasion, wherein the configuration indicates one or more of an uplink control channel resource and an uplink shared channel resource over which to send the DCI feedback, transmitting, to the UE, DCI over the downlink control channel during the downlink control channel monitoring occasion, and receiving, from the UE, DCI feedback over the one or more of the uplink control channel resource and the uplink shared channel resource indicated in the configuration.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

For example, an apparatus for wireless communication is provided that includes a transceiver, a memory configured to store instructions, and one or more processors communicatively coupled with the transceiver and the memory, where the one or more processors are configured to receive, from a base station, a configuration for sending a DCI feedback for a downlink control channel monitoring occasion, wherein the configuration indicates one or more of an uplink control channel resource and an uplink shared channel resource over which to send the DCI feedback, receive, from the base station, a DCI over the downlink control channel during the downlink control channel monitoring occasion, process the DCI, and transmit, based on receiving the DCI and processing the DCI, DCI feedback to the base station over the one or more of the uplink control channel resource and the uplink shared channel resource indicated in the configuration.

In another example, an apparatus for wireless communication is provided that includes a transceiver, a memory configured to store instructions, and one or more processors communicatively coupled with the transceiver and the memory, where the one or more processors are configured to transmit, to a UE, a configuration for sending a DCI feedback for a downlink control channel monitoring occasion, wherein the configuration indicates one or more of an uplink control channel resource and an uplink shared channel resource over which to send the DCI feedback, transmit, to the UE, a DCI over the downlink control channel during the downlink control channel monitoring occasion, and receive, from the UE, DCI feedback over the one or more of the uplink control channel resource and the uplink shared channel resource indicated in the configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
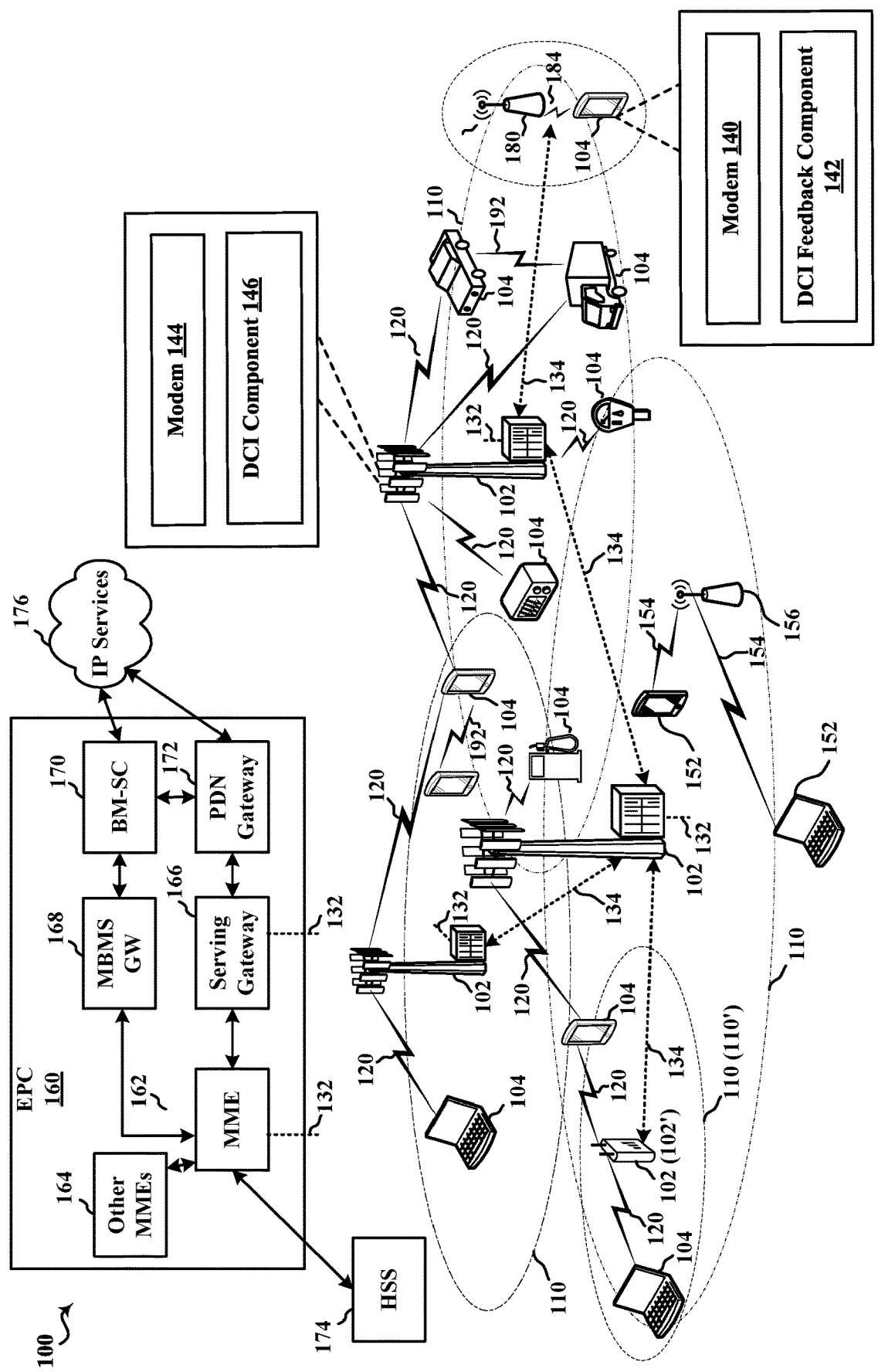
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing a mechanism to enable feedback for downlink control information (DCI) sent over a downlink control channel, such as a physical downlink control channel (PDCCH) defined in a third generation partnership project (3GPP) network technology, or a network technology derived therefrom, such as long term evolution (LTE), fifth generation (5G) new radio (NR), etc. For example, downlink control channels can carry downlink and/or uplink grants using DCI, which is transmitted from one node, such as a base station, to another node, such as a UE, to allow the UE to receive downlink communication from the base station and/or transmit uplink communications to the base station. The base station may be one of a gNB, a central unit (CU), a plurality of distributed units (DUs), etc.

Some deployments, such as 5G NR deployments that use ultra-reliable low latency communication (URLLC), can specify or otherwise require certain latency and reliability specifications. In such deployments, downlink control channel reliability can be important as the downlink control channel carries the downlink and/or uplink grants. For example, on detecting a change in radio frequency (RF) conditions (e.g., sharp signal degradation), new downlink and/or uplink grants may be sent quickly to facilitate communicating before signals are lost between nodes. In this example, sending DCI feedback can help with latency and reliability of a DCI sent over downlink control channels, as certain feedback may trigger sending of another DCI (e.g., without having to wait for a timeout or other indication that DCI may not have been received) to convey a whole or a part of the information in the DCI. Thus, a reliable and resource-efficient DCI feedback mechanism for DCIs sent using the downlink control channel, as described in examples herein, may be useful. In examples described herein, DCI feedback may be transmitted to a base station over uplink control channel (e.g., physical uplink control channel (PUCCH)) and/or uplink shared channel resources (e.g., physical uplink shared channel (PUSCH)).

In one example, the base station (or other network node) can send a DCI feedback configuration to a UE to configure the UE to transmit DCI feedback over one or more of an uplink control channel resource and an uplink shared channel resource. The resource(s) can be indicated by the DCI feedback configuration and/or by a DCI sent during a downlink control channel monitoring occasion. For example, the downlink control channel monitoring occasion can be configured for the UE (e.g., by the network node) by various mechanisms, such as using radio resource control (RRC) messages transmitted to the UE indicating timing of downlink control channel monitoring occasions, using control resource set configurations, using search space set configurations, using semi-persistent scheduling (SPS) parameters, and/or the like. For example, the DCI indicating the feedback configuration may correspond to the DCI for which the UE is to provide DCI feedback or a different DCI. Once configured, for example, the UE can receive DCI and transmit DCI feedback to the base station to indicate whether DCI is received and/or correctly decoded. If not, the base station can retransmit a part of the information of the DCI to facilitate complying with latency and/or reliability requirements for the network deployment, as described.

In one specific non-limiting example, aspects described herein can be employed in an industrial or factory automation environment where various devices can communicate with one another, and/or with a factory management system, using a wireless communication technology. In such configurations, for example, semi-persistent scheduling (SPS) or configured scheduling (CS) may be employed to schedule communications among various nodes. For example, the factory automation management system may be an industrial personal computer (PC) that provides controller programming, software and security management, long term key performance indicator (KPI) monitoring, etc. In addition, the factory automation environment may include multiple human machine interfaces (HMI) that communicate with the factory management system, and may include tablet, panels, wearable devices, etc., that can provide machine control on the factory floor (e.g., start/stop certain machines), mode changes for given machines (e.g., from widget 1 to widget 2), augmented reality (AR) and/or virtual reality (VR) scenarios for controlling factory systems, etc.

The factory automation environment may also include one or more programmable logic controllers (PLC) that may include custom hardware for issuing commands (e.g., motion) to machine actuators and/or receiving sensor inputs in real time, and/or coordinating with other PLCs to read/control machines. The factory automation environment may also include the sensors and/or actuators that control the machines (e.g., rotary motion, servo motors, position sensors, etc.). Traffic among the various nodes of the factory automation environment can be mission-critical and mostly periodic, including cyclic exchanges among PLCs/sensors/actuators. The factory can have multiple production cells (e.g., about 100-1000), where a cell size can be around 10 meters×10 meters×3 meters in volume, and there can be about 20-50 nodes per cell. The factory automation environment can also include non-mission-critical traffic. Providing DCI feedback, as described herein, may help to achieve latency and reliability requirements for communications among the various nodes of the factory automation environment (e.g., where the nodes may be or may use a UE and/or corresponding components described herein).

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example wireless communication access network 100 includes at least one UE 104 with a modem 140 for communicating in a wireless network and a DCI feedback component 142 for communicating DCI feedback for DCI received (or not received) from one or more base stations 102, as described above and further herein. Further, wireless communication access network 100, also referred to as a wireless wide area network (WWAN), includes at least one base station 102 via which the UE 104 can communicate with one or more nodes of the wireless communication access network to communicate data corresponding to the service. The base station 102 can also have a modem 144 for communicating in the wireless network and a DCI component 146 for configuring one or more parameters for a UE 104 to transmit DCI feedback to the base station 102 for DCI transmitted by the base station 102, as described further herein.

The one or more UEs 104 and/or the one or more base stations 102 may communicate with other UEs and/or other base stations via an Evolved Packet Core (EPC) 160 or a 5G core. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information. In other examples, a 5G core may include other components or functions that may be accessible by the base station 102 over a backhaul link in a 5G wireless network, such as a Access and Mobility Management Function (AMF) a Session Management Function (SMF), a User Plane Function (UPF), a Unified Data Management (UDM), etc.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include factory equipment or nodes, as described above, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Moreover, for example, as part of an industrial IoT deployment, the UEs 104 may include IoT devices, such as sensors, actuators, PLCs, HMIs, etc., as described above, that communicate with one another via one or more access points (e.g., base station 102) and/or using device-to-device communications. In any case, aspects described herein regarding DCI feedback can be used in such deployments to achieve latency and/or reliability requirements by improving control channel communications and thus resource grants between the devices.

Figure 2:
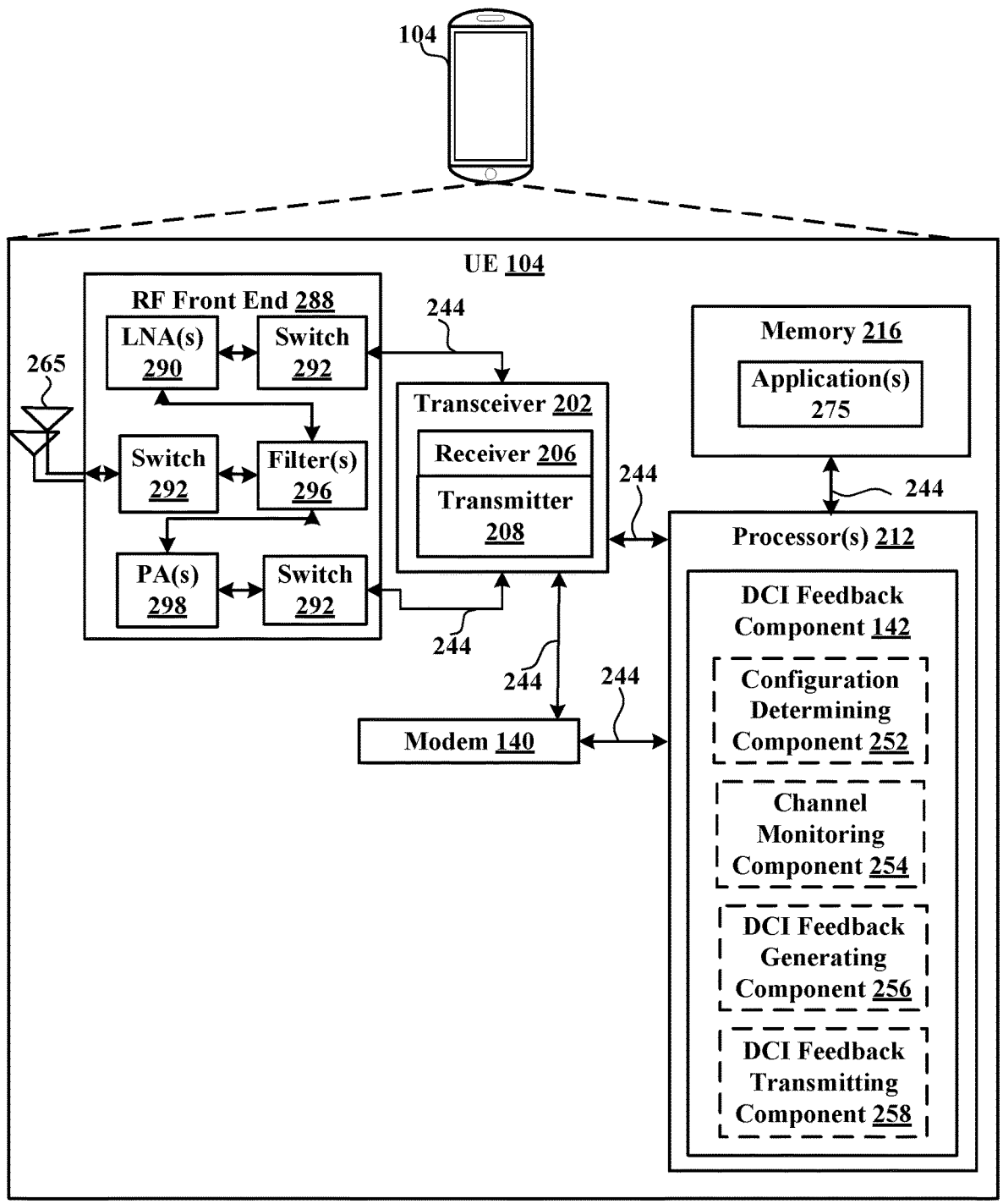
FIG. 2 is a block diagram illustrating an example of a UE, in accordance with various aspects of the present disclosure.
Figure 3:
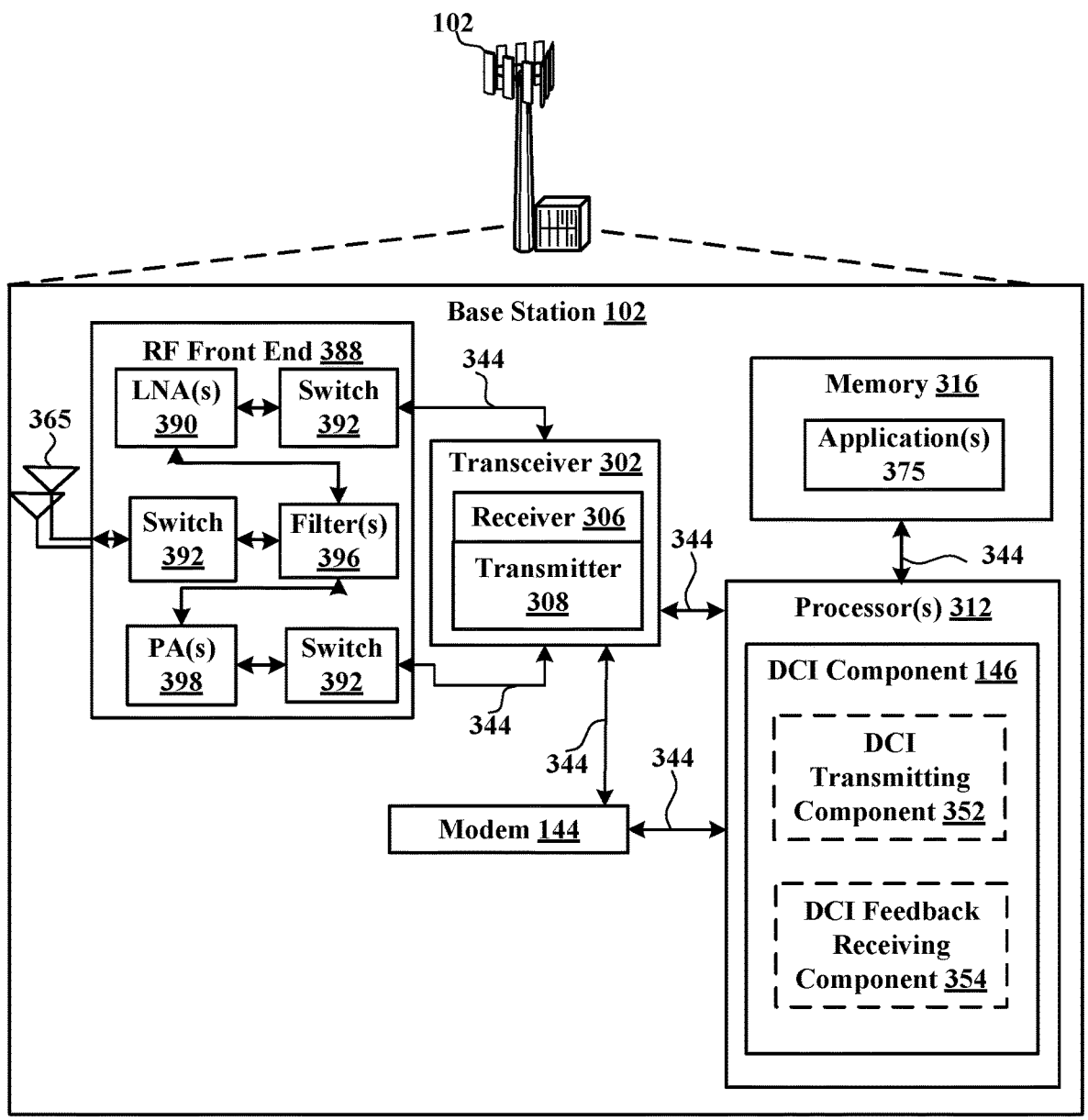
FIG. 3 is a block diagram illustrating an example of a base station, in accordance with various aspects of the present disclosure.
Figure 4:
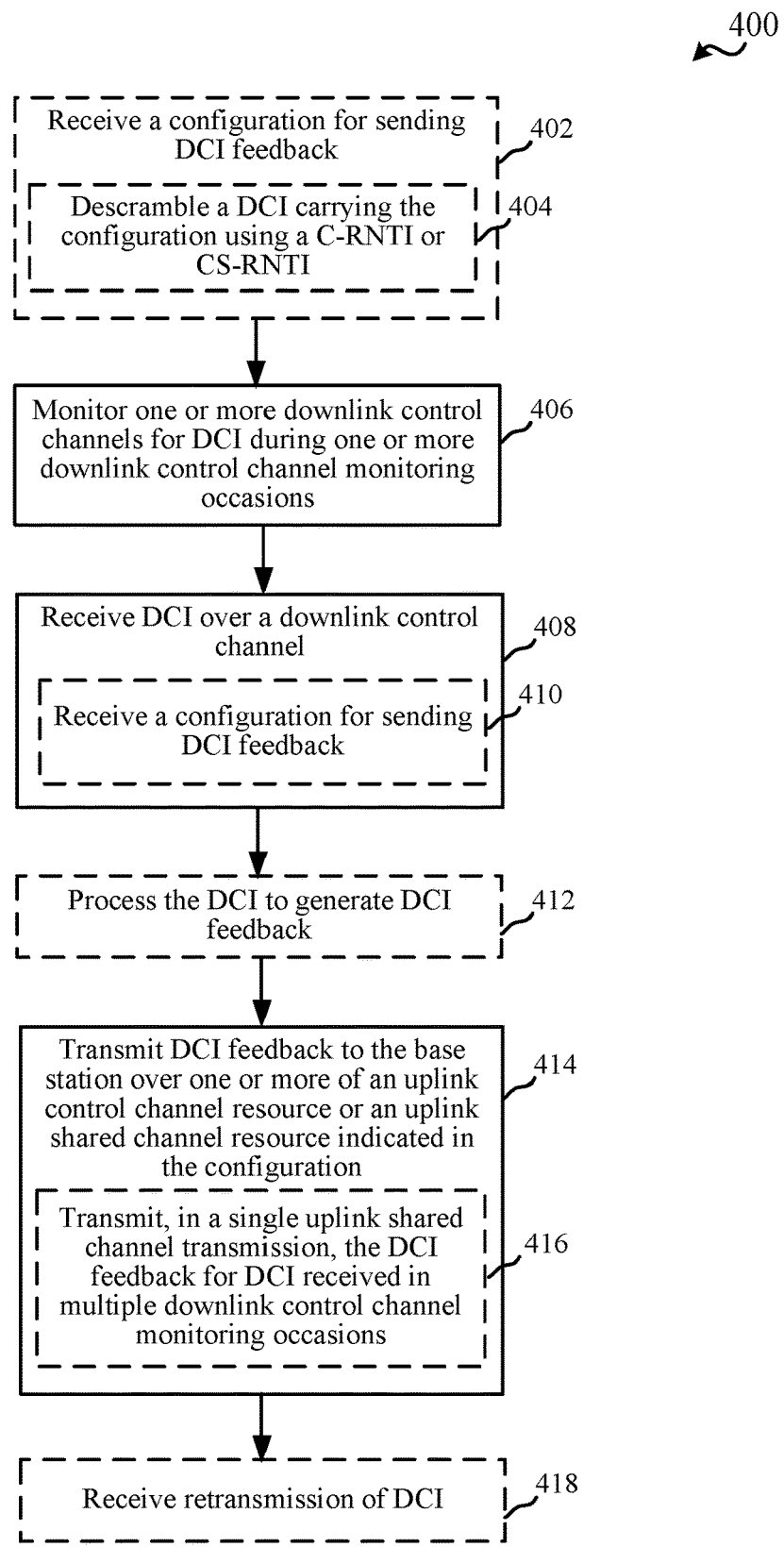
FIG. 4 is a flow chart illustrating an example of a method for transmitting downlink control information (DCI) feedback, in accordance with various aspects of the present disclosure.
Figure 5:
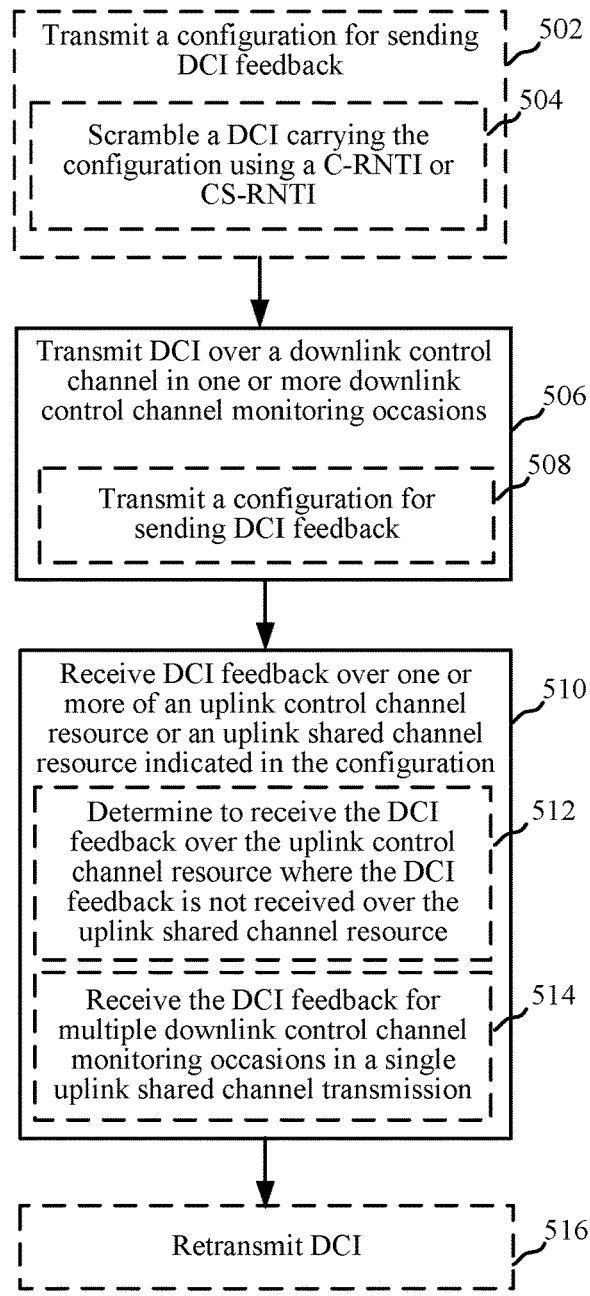
FIG. 5 is a flow chart illustrating an example of a method for receiving DCI feedback, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or DCI feedback component 142 to enable one or more of the functions described herein related to receiving DCI from one or more base stations 102 and/or providing DCI feedback for the DCI.

In an aspect, the one or more processors 212 can include a modem 140 and/or can be part of the modem 140 that uses one or more modem processors. Thus, the various functions related to DCI feedback component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with DCI feedback component 142 may be performed by transceiver 202.

Also, memory 216 may be configured to store data used herein and/or local versions of applications 275 or DCI feedback component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining DCI feedback component 142 and/or one or more of its subcomponents, and/or data associated therewith, when UE 104 is operating at least one processor 212 to execute DCI feedback component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, DCI feedback component 142 can optionally include a configuration determining component 252 for obtaining a configuration for transmitting DCI feedback, a channel monitoring component 254 for monitoring one or more downlink control channels during one or more downlink control channel monitoring occasions to receive (or not receive) DCI, a DCI feedback generating component 256 for generating DCI feedback based on receiving (or not receiving) and/or decoding DCI, and/or a DCI feedback transmitting component 258 for transmitting the generated DCI feedback.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 may include a variety of components, some of which have already been described above, but including components such as one or more processors 312 and memory 316 and transceiver 302 in communication via one or more buses 344, which may operate in conjunction with modem 144 and DCI component 146 for configuring DCI feedback resources for one or more UEs 104 to use in transmitting DCI feedback to the base station 102.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, DCI component 146 can optionally include a DCI transmitting component 352 for transmitting DCI to one or more UEs over one or more downlink control channels, and/or a DCI feedback receiving component 354 for receiving DCI feedback for the transmitted DCI from one or more of the UEs.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for transmitting DCI feedback based on a received configuration. In an example, a UE 104 can perform the functions described in method 400 using one or more of the components described in FIGS. 1-2.

In method 400, optionally at Block 402, a configuration for sending DCI feedback can be received. In an aspect, configuration determining component 252, e.g., in conjunction with processor(s) 212, memory 216, transceiver 202, DCI feedback component 142, etc., can receive the configuration for sending DCI feedback. For example, configuration determining component 252 can receive the configuration from a base station 102 or other network node transmitting the configuration, where the configuration can indicate one or more of an uplink control channel resource (e.g., PUCCH) and/or an uplink shared channel resource (e.g., PUSCH), and/or parameters related thereto, over which to transmit DCI feedback, where the DCI feedback can be for a DCI (or multiple DCIs) received (or not received) from the base station 102 in one or more downlink control channel monitoring occasions. In one example, configuration determining component 252 can receive the configuration in an explicit configuration message and/or in one or more signals including a DCI (e.g., the DCI for which the feedback is to be sent or a different DCI). In a specific example, configuration determining component 252 can receive the configuration in a radio resource control (RRC) message, a media access control (MAC) layer control element (MAC CE), a non-access stratum (NAS) message, and/or the like. For example, the configuration may indicate time and/or frequency resources corresponding to the uplink control channel resource and/or uplink shared channel resource, such as a resource block (RB) index or indices, another indication of a frequency subcarrier, a symbol of a slot corresponding to the channel, parameters for determining the frequency and/or time resources, and/or the like.

In one example, where the configuration is received in a DCI, optionally at Block 404, the DCI carrying the configuration can be descrambled using a cell radio network temporary identifier (C-RNTI) or a configured scheduling radio network temporary identifier (CS-RNTI). In an aspect, configuration determining component 252, e.g., in conjunction with processor(s) 212, memory 216, transceiver 202, DCI feedback component 142, etc., can descramble the DCI carrying the configuration using the C-RNTI or CS-RNTI assigned to the UE 104. In this example, the configuration can be sent by the base station 102 in a different DCI than the DCI for which feedback is to be provided, and the base station 102 may accordingly scramble the configuration as part of transmitting the DCI. For example, the UE 104 can be assigned a C-RNTI or CS-RNTI by the base station 102 for determining whether DCI sent over a control channel in a search space is intended for the UE 104. Accordingly, for example, configuration determining component 252 can descramble received DCI using the C-RNTI and/or CS-RNTI (where the separate DCI in this example is associated with a Configured Scheduling for the UE 104), and where the descrambling is successful (e.g., where the descrambling results in receiving the configuration), configuration determining component 252 can apply the configuration for transmitting feedback for subsequently received (or not received) DCI, as described further herein. In an example, descrambling can include descrambling a cyclic redundancy check (CRC) portion of a symbol, over which the configuration is received, based on the C-RNTI, CS-RNTI, etc.

In method 400, at Block 406, one or more downlink control channels can be monitored for DCI during one or more downlink control channel monitoring occasions. In an aspect, channel monitoring component 254, e.g., in conjunction with processor(s) 212, memory 216, transceiver 202, DCI feedback component 142, etc., can monitor the one or more downlink control channels for DCI during the one or more downlink control channel monitoring occasions. In this example, channel monitoring component 254 can determine the one or more downlink control channel monitoring occasions on a per slot basis, where a slot can include a number of symbols (e.g., OFDM symbols, SC-FDM symbols, etc.). For example, the slot can include 14 symbols (e.g., for normal cyclic prefix) or a less number of symbols, where a slot with less than 14 symbols can be referred to as a mini-slot. Thus, in one example, channel monitoring component 254 can determine the one or more downlink control channel monitoring occasions as occurring at a certain symbol or symbols in each slot (e.g., such as a collection of symbol indices in the slot, which may include an associated periodicity and/or offset from a symbol in the slot), and can accordingly monitor for DCI during the one or more downlink control channel monitoring occasions. For example, the periodicity and/or offset may be indicated as values of units of symbols, slots, milliseconds, another time unit, etc.

In other examples, channel monitoring component 254 can determine the one or more downlink control channel monitoring occasions based on a periodicity of configured scheduling for the UE 104 (e.g., a SPS periodicity), based on one or more PDCCH search space sets configured for the UE 104 (e.g., for searching based on RNTI, as described above), etc., which may be configured by the base station 102 transmitting the DCI or other base stations or network nodes. In another example, channel monitoring component 254 may determine the one or more downlink control channel monitoring occasions from the configuration. For example, the configuration for sending DCI feedback that is received by configuration determining component 252 can indicate one or more downlink control channel monitoring occasions in each slot, each downlink-centric slot, each uplink-centric slot, and/or the like.

In addition, in method 400, at Block 408, DCI can be received over a downlink control channel. In an aspect, DCI feedback component 142, e.g., in conjunction with processor(s) 212, memory 216, transceiver 202, etc., can receive the DCI over the downlink control channel. For example, DCI feedback component 142 can receive the DCI over the downlink control channel in one or more of the downlink control channel monitoring occasions. For example, DCI feedback component 142 can receive communications over resources related to the downlink control channel in the monitoring occasion, and can attempt to decode the communications based on a C-RNTI, CS-RNTI, etc. associated with the UE 104.

In one example, the DCI received over the control channel can also include the configuration for sending DCI feedback, and thus receiving the DCI at Block 408 may optionally include, at Block 410, receiving a configuration for sending DCI feedback. As described in an aspect, configuration determining component 252, e.g., in conjunction with processor(s) 212, memory 216, transceiver 202, DCI feedback component 142, etc., can receive the configuration for sending DCI feedback. For example, configuration determining component 252 can obtain the configuration as one or more parameters specified in the DCI feedback and/or can determine one or more parameters for transmitting the DCI feedback based on the received DCI. In one example, configuration determining component 252 may receive the configuration (e.g., or portions thereof) in both the DCI and separate signaling (e.g., a different DCI, RRC message, MAC CE message, NAS message, etc., as described). In one example, configuration determining component 252 can include instructions for resolving parameters where conflicting configurations are received in multiple signals (e.g., use a separately signaled configuration until or unless a configuration is received in a DCI). In one example, the rules may be configured by the base station 102, another base station or network node, etc.

In addition, in method 400, optionally at Block 412, the DCI can be processed to generate DCI feedback. In an aspect, DCI feedback generating component 256, e.g., in conjunction with processor(s) 212, memory 216, transceiver 202, etc., can process the DCI to generate DCI feedback. For example, DCI feedback generating component 256 can process the DCI at least in part by one or more of determining that a CRC of the DCI is scrambled using a RNTI (e.g., C-RNTI or CS-RNTI) associated with the UE (e.g., which may include attempting to descramble the CRC using the RNTI), parsing various fields in the DCI, and/or the like. As described, DCI feedback generating component 256 can accordingly generate the DCI feedback (e.g., as one or more bits) to indicate whether the DCI feedback is successfully received and/or correctly decoded, and/or the like. In other examples, DCI feedback generating component 256 can also generate DCI feedback where the DCI is not received in one or more expected (e.g., configured) downlink control channel monitoring occasions.

In addition, in method 400, at Block 414, DCI feedback can be transmitted to the base station over one or more of an uplink control channel resource or an uplink shared channel resource indicated in the configuration. In an aspect, DCI feedback transmitting component 258, e.g., in conjunction with processor(s) 212, memory 216, transceiver 202, DCI feedback component 142, etc., can transmit the DCI feedback, as generated, to the base station over the one or more of the uplink control channel resource (e.g., PUCCH) or the uplink shared channel resource (e.g., PUSCH) indicated in the configuration. For example, DCI feedback component 142 can transmit the DCI feedback over the uplink shared channel resource whenever configured and can use the uplink control channel resource otherwise. Additionally, the DCI feedback can indicate at least one of whether the DCI was received in the expected downlink control channel monitoring occasion and/or whether the DCI was correctly decoded. Moreover, the DCI feedback can correspond to an acknowledgement (ACK)/negative-ACK (NACK) indicating whether the DCI feedback was successfully received and decoded (where the DCI feedback can be ACK) or not (where the DCI feedback can be NACK). In other examples, the DCI feedback can correspond to other indications regarding whether DCI feedback was received and/or correctly decoded, quality or strength of a signal including the DCI, etc. For example, it may be determined that the DCI is correctly decoded if it is determined that the CRC associated with the DCI is scrambled by a RNTI configured by the base station (e.g., C-RNTI, CS-RNTI, etc.) and/or if a cyclic redundancy determination using the CRC is successful.

In one example, transmitting DCI feedback at Block 412 can optionally include, at Block 416, transmitting, in a single uplink shared channel transmission, the DCI feedback for DCI received in multiple downlink control channel monitoring occasions. In an aspect, DCI feedback component 142, e.g., in conjunction with processor(s) 212, memory 216, transceiver 202, etc., can transmit, in the single uplink shared channel transmission (e.g., over the uplink shared channel resource indicated in the configuration), the DCI feedback for DCI received in multiple downlink control channel monitoring occasions. For example, transmitting the DCI in the signal uplink shared channel transmission can include bundling the DCI feedback in a single transmission for the multiple DCIs (which can indicate multiple feedback values for each DCI, a lesser number of feedback values for the multiple DCIs, a single feedback value representing feedback for the multiple DCIs, etc.). In an example, DCI feedback component 142 can transmit one or more DCI feedback values to represent feedback for DCI received in a last N number of slots, where DCI feedback component 142 can determine N based one or more of: 1) a periodicity of Configured Scheduling for the UE 104 when PUSCH transmission is configured to be scheduled using a Configured Scheduling (e.g., SPS); 2) a PDCCH monitoring frequency configuration, which may in turn be based on one or more PDCCH search space sets configured for the UE 104 to search for DCI intended for the UE 104 (e.g., as configured by the base station 102); and/or 3) the configuration received by configuration determining component 252, as described above. In a specific example, the DCI feedback component 142 can determine a value N based on the PDCCH monitoring frequency. In this example, if the uplink shared channel has a periodicity of 2 slots, and PDCCH monitoring is one every slot, the DCI feedback information can include 2 bits with one bit for PDCCH feedback for one of two previous slots. In addition, in another example, DCI feedback component 142 can generate and transmit DCI feedback in a single transmission for all DCI received during slots within a Configured Scheduling period, all DCI received in the one or more PDCCH search space sets, and/or the like.

In addition, in method 400, optionally at Block 418, a retransmission of DCI can be received. In an aspect, DCI feedback component 142, e.g., in conjunction with processor(s) 212, memory 216, transceiver 202, etc., can receive the retransmission of the DCI, which can be based on the DCI feedback. For example, where DCI feedback component 142 indicates that the DCI is not successfully received or decoded (e.g., DCI where the DCI feedback indicates NACK), the base station 102 can retransmit the DCI, which can be received at Block 418.

FIG. 5 illustrates a flow chart an example of a method 500 for receiving DCI feedback from one or more UEs. In an example, a base station 102 can perform the functions described in method 500 using one or more of the components described in FIGS. 1 and 3.

In method 500, optionally at Block 502, a configuration for sending DCI feedback can be transmitted. In an aspect, DCI component 146, e.g., in conjunction with processor(s) 312, memory 316, transceiver 302, etc., can transmit a configuration for sending DCI feedback. For example, DCI component 146 can transmit the configuration to one or more UEs 104, and can transmit the configuration as an explicit configuration signal (e.g., as a RRC message, MAC CE message, NAS message, etc.) and/or in a DCI (e.g., the DCI for which feedback is requested, a separate DCI, etc.). In addition, as described, the configuration can indicate one or more of an uplink control channel resource and/or an uplink shared channel resource over which the one or more UEs 104 are to transmit the DCI feedback. For example, the configuration may indicate time and/or frequency resources corresponding to the uplink control channel resource and/or uplink shared channel resource, such as a resource block (RB) index or indices, another indication of a frequency subcarrier, a symbol of a slot corresponding to the channel, parameters for determining the frequency and/or time resources, and/or the like.

As described, where the configuration is transmitted in a DCI (e.g., a DCI other than that for which feedback is requested), the DCI can be scrambled based on a RNTI of the UE. Thus, for example, transmitting the configuration at Block 502 may optionally include, at Block 504, scrambling a DCI carrying the configuration using a C-RNTI or a CS-RNTI. In an aspect, DCI component 146, e.g., in conjunction with processor(s) 312, memory 316, transceiver 302, etc., can scramble the DCI carrying the configuration, where the scrambling can be performed using a C-RNTI or a CS-RNTI (or other RNTI) assigned to the UE 104. This can facilitate the UE 104 receiving, descrambling, and accordingly processing the DCI to obtain the configuration, as described. Moreover, for example, scrambling can include scrambling a CRC of the DCI based on the C-RNTI or the CS-RNTI.

In method 500, at Block 506, DCI can be transmitted over a downlink control channel in one or more downlink control channel monitoring occasions. In an aspect, DCI transmitting component 352, e.g., in conjunction with processor(s) 312, memory 316, transceiver 302, DCI component 146, etc., can transmit the DCI over the downlink control channel in the one or more downlink control channel monitoring occasions. For example, DCI transmitting component 352 can transmit DCI, which can include downlink and/or uplink resource grants for the UE 104, as described, and can transmit the DCI in the downlink control channel monitoring occasions, which can include one or more symbols in one or more slots, as described. For example, the downlink control channel monitoring occasions over which DCI transmitting component 352 transmits DCI can include a certain symbol index or indices (e.g., and/or an associated periodicity, offset, etc., as described), which may correspond to each slot, each downlink-centric slot, each uplink-centric slot (e.g., where downlink-centric and/or uplink-centric slots can be as specified in a slot configuration received from the base station 102), etc. In another example, the downlink control channel monitoring occasions over which DCI transmitting component 352 transmits DCI can include slots and/or corresponding symbols determined based on a periodicity of configured scheduling for the UE 104 (e.g., a SPS periodicity), based on one or more PDCCH search space sets configured for the UE 104 (e.g., for searching based on RNTI, as described above), etc. In another example, channel monitoring component 254 may determine the one or more downlink control channel monitoring occasions as slots and/or corresponding symbols based on the configuration transmitted by the DCI component 146. In any case, as described, DCI component 146 can configure the downlink control channel monitoring occasions (e.g., as part of the configuration sent at Block 502 or otherwise).

In an example, transmitting the DCI at Block 506 can optionally include, at Block 508, transmitting a configuration for sending DCI feedback. In an aspect, as described, DCI component 146, e.g., in conjunction with processor(s) 312, memory 316, transceiver 302, etc., can transmit a configuration for sending DCI feedback. For example, DCI component 146 can transmit the configuration in the DCI (e.g., the DCI for which feedback is requested) in addition or alternatively to transmitting a configuration in a dedicated signal (e.g., RRC message, MAC CE message, NAS message, etc.) or other DCI. In addition, as described, DCI component 146 may transmit the configuration with the DCI to override or specify additional parameters for another configuration received in a different DCI or dedicated message.

In method 500, at Block 510, DCI feedback can be received over one or more of an uplink control channel resource or an uplink shared channel resource indicated in the configuration. In an aspect, DCI feedback receiving component 354, e.g., in conjunction with processor(s) 312, memory 316, transceiver 302, DCI component 146, etc., can receive the DCI feedback over the one or more of the uplink control channel resource or the uplink shared channel resource indicated in the configuration. As described, the DCI feedback can include an indication of whether the DCI was received in an expected downlink control channel monitoring occasion, whether the DCI was successfully decoded, and/or the like. In an example, where the DCI feedback indicates that the DCI was not successfully received or decoded, the base station 102 can retransmit the DCI, as described herein.

In addition, in an example, receiving the DCI feedback at Block 510 can optionally include, at Block 512, determining to receive the DCI feedback over the uplink control channel resource where the DCI feedback is not received over the uplink shared channel resource. In an aspect, DCI feedback receiving component 354, e.g., in conjunction with processor(s) 312, memory 316, transceiver 302, DCI component 146, etc., can determine to receive the DCI feedback over the uplink control channel resource where the DCI feedback is not received over the uplink shared channel resource. As described, for example, the UE 104 can use shared channel resources for DCI feedback when configured and control channel resources otherwise; thus, the base station 102 can obtain DCI feedback over the shared channel resources where present.

Moreover, in an example, receiving the DCI feedback at Block 510 can optionally include, at Block 514, receiving the DCI feedback for multiple downlink control channel monitoring occasions in a single uplink shared channel transmission. In an aspect, DCI feedback receiving component 354, e.g., in conjunction with processor(s) 312, memory 316, transceiver 302, DCI component 146, etc., can receive the DCI feedback for the multiple downlink control channel monitoring occasions in the single uplink shared channel transmission. As described, the UE 104 can bundle DCI feedback for multiple DCIs received over one or more downlink control channels in one or more downlink control channel monitoring occasions in the single transmission. For example, the DCI feedback in this example can include one or more DCI feedback values to represent feedback for DCI received in a last N number of slots, where N can be determined based on one or more of: 1) a periodicity of Configured Scheduling for the UE 104 when PUSCH transmission is configured to be scheduled using a Configured Scheduling (e.g., SPS); 2) a PDCCH monitoring frequency configuration, which may in turn be based on one or more PDCCH search space sets configured for the UE 104 to search for DCI intended for the UE 104 (e.g., as configured by the base station 102); and/or 3) the configuration received by configuration determining component 252, as described above. In this example, DCI feedback receiving component 354 can accordingly interpret the DCI feedback as applying to the multiple DCI transmissions, and can determine to retransmit one or more of the multiple DCI transmissions for which the feedback is provided.

In addition, in method 500, at Block 516, DCI can be retransmitted. In an aspect, DCI transmitting component 352, e.g., in conjunction with processor(s) 212, memory 216, transceiver 202, DCI component 146, etc., can retransmit the DCI. For example, DCI transmitting component 352 can retransmit the DCI based on the DCI feedback, as described above (e.g., where negative feedback is received).

In the various examples described above, a network or related node may send a DCI feedback configuration to configure a UE to send a DCI feedback for a PDCCH monitoring occasion using one or more of a PUCCH resource and PUSCH resource. If both PUSCH and PUCCH resources are configured and PUSCH resources are available before PUCCH resources, the UE can use PUCCH resources to transmit DCI feedback, in one example, only if it is detected that PUSCH is not received.

In some examples, the PUCCH and PUSCH resources can be indicated by one or more of a DCI sent by the base station during the PDCCH monitoring occasion and the DCI feedback configuration. In addition, for example, the PUSCH resources can be scheduled by one or more of a DCI sent during the PDCCH monitoring occasion, a DCI sent in a different PDCCH-monitoring-occasion, and/or the like. The CRC for the DCI sent in a different PDCCH-monitoring-occasion can be scrambled using a C-RNTI or a CS-RNTI (the separate DCI in this case can be associated with a Configured Scheduling for the UE).

Once configured, for example, a PUSCH transmission by the UE in a PUSCH transmission slot may carry DCI-feedback for DCIs received during last N slots, where N is determined for a UE based one or more of the periodicity of configured scheduling for uplink when the PUSCH transmission is scheduled using a configured scheduling, PDCCH monitoring frequency configuration, which may in turn be based on one or more PDCCH search space sets configured for the UE (e.g., if PUSCH has periodicity of 2 slots and PDCCH monitoring is once every slot, the feedback information can comprise of 2 bits with one bit each associated with PDCCH feedback for one of two previous slots), and/or the DCI feedback configuration.

Moreover, for example, the set of PDCCH monitoring occasions may be included in (e.g., indicated by) DCI feedback configuration and may be one or more of each slot, each DL centric slot, and each UL centric slot, and/or one or more PDCCH search space sets configured for the UE. In an example, the DCI feedback for a PDCCH monitoring occasion may include an indication about whether or not a DCI was received by the UE during the PDCCH monitoring occasion and/or whether or not the DCI was correctly descrambled and/or decoded. In an example, the network can send the DCI feedback configuration to the UE using one or more of a RRC message, a DCI message, a MAC CE or NAS message. The determination to configure may be based on a UE capability indication. Additionally, as described herein, the slot may be slot with 14 symbols or a slot with fewer symbols (i.e., mini-slot).

Figure 6:
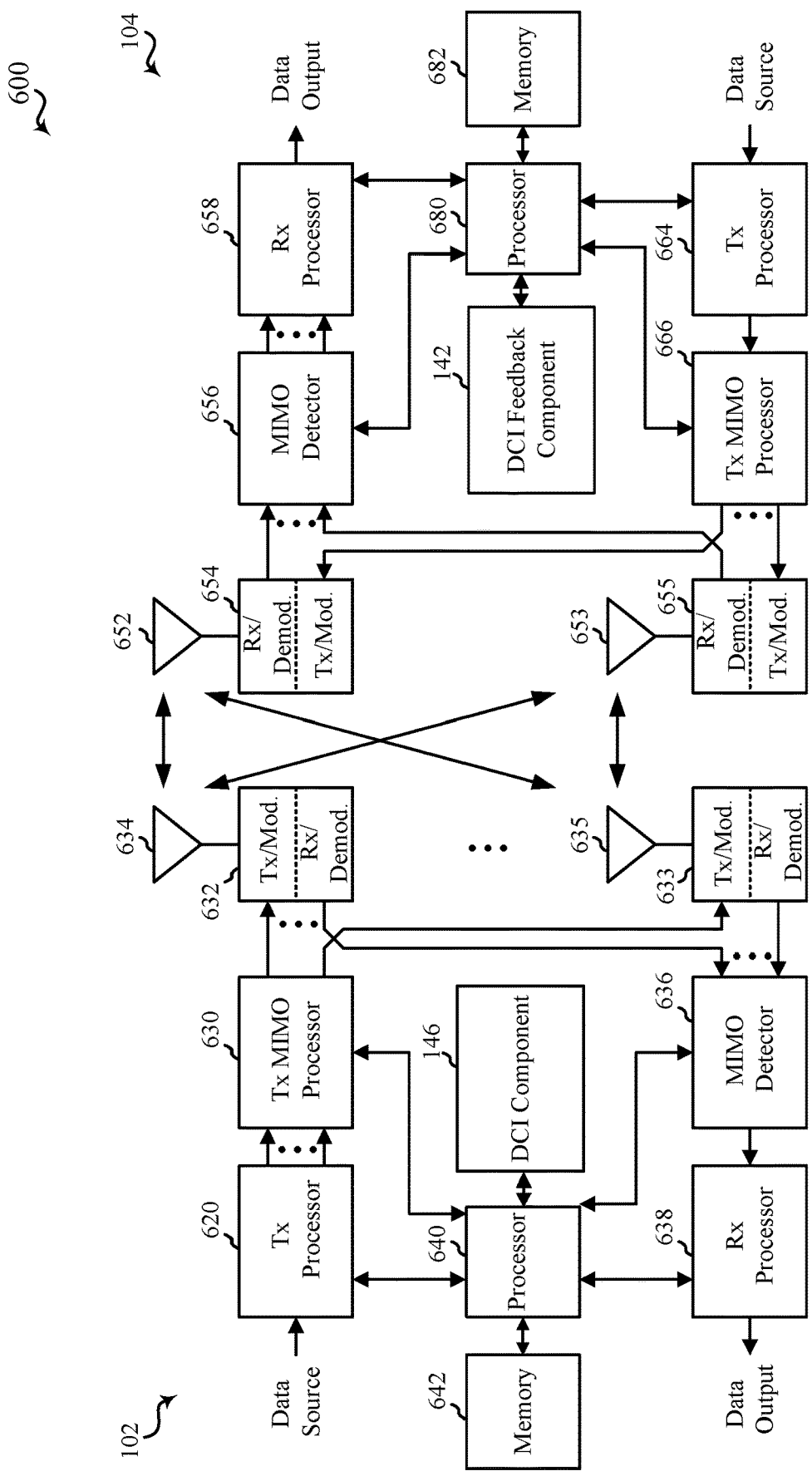
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a DCI feedback component 142 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a DCI component 146 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving, from a network node, a configuration message including a configuration for sending a downlink control information (DCI) feedback for a downlink control channel monitoring occasion, wherein the configuration indicates one or more of an uplink control channel resource and an uplink shared channel resource over which to send the DCI feedback, and wherein the DCI feedback includes one bit that can indicate an acknowledgement (ACK) where DCI is received during the downlink control channel monitoring occasion and a negative-ACK where DCI is not received during the downlink control channel monitoring occasion;
   receiving, from the network node, a DCI over the downlink control channel during the downlink control channel monitoring occasion;
   processing the DCI; and
   transmitting, based on receiving the DCI and processing the DCI, DCI feedback to the network node over the one or more of the uplink control channel resource and the uplink shared channel resource indicated in the configuration, wherein transmitting the DCI feedback comprises transmitting the DCI feedback in a single uplink shared channel transmission, and wherein the DCI feedback in the single uplink shared channel transmission comprises feedback for DCIs received during multiple downlink control channel monitoring occasions.

2. The method of claim 1, wherein the receiving the configuration message comprises in part receiving a part of the configuration as part of the DCI received over the downlink control channel.

3. The method of claim 1, wherein the receiving the configuration message comprises in part receiving a part of the configuration as part of a second DCI received during a different downlink control channel monitoring occasion.

4. The method of claim 1, wherein the one or more of the uplink control channel resource and the uplink shared channel resource is scheduled by a second DCI transmitted during a different downlink control channel monitoring occasion.

5. The method of claim 4, wherein a cyclic redundancy check (CRC) for the second DCI is scrambled using a cell radio network temporary identifier (C-RNTI) or a configured scheduling radio network temporary identifier (CS-RNTI) configured by the network node.

6. The method of claim 1, further comprising determining the multiple downlink control channel monitoring occasions based at least on one or more of a periodicity of configured scheduling, a downlink control channel monitoring frequency determined from a downlink control channel search space set, and the configuration.

7. The method of claim 1, wherein the configuration indicates a set of downlink control channel monitoring occasions including the downlink control channel monitoring occasion, and further comprising monitoring the downlink control channel during the downlink control channel monitoring occasion to receive the DCI.

8. The method of claim 7, wherein the configuration indicates the set of downlink control channel monitoring occasions as one or more of: each slot; a collection of symbol indices including associated periodicity and offset; each downlink-centric slot; each uplink-centric slot; and one or more downlink control channel monitoring occasions associated with one or more configured downlink control channel search space sets.

9. The method of claim 1, wherein transmitting the DCI feedback comprises transmitting an indicator of at least one of: whether the DCI is received during the downlink control channel monitoring occasion; and whether the DCI is received during the downlink control channel monitoring occasion and correctly decoded.

10. The method of claim 1, wherein receiving the configuration message comprises receiving the configuration message in one or more of a radio resource control (RRC) message, the DCI, a different DCI, a media access control (MAC) control element (CE), or a non-access stratum (NAS) message.

11. A method for wireless communication, comprising:
    transmitting, to a user equipment (UE), a configuration message including a configuration for sending a downlink control information (DCI) feedback for a downlink control channel monitoring occasion, wherein the configuration indicates one or more of an uplink control channel resource and an uplink shared channel resource over which to send the DCI feedback, and wherein the DCI feedback includes one bit that can indicate an acknowledgement (ACK) where DCI is received by the UE during the downlink control channel monitoring occasion and a negative-ACK where DCI is not received by the UE during the downlink control channel monitoring occasion;

transmitting, to the UE, a DCI over the downlink control channel during the downlink control channel monitoring occasion; and receiving, from the UE, DCI feedback over the one or more of the uplink control channel resource and the uplink shared channel resource indicated in the configuration, wherein receiving the DCI feedback comprises receiving the DCI feedback in a single uplink shared channel transmission by the UE, and wherein the DCI feedback in the single uplink shared channel transmission from the UE comprises feedback for DCIs received during multiple downlink control channel monitoring occasions.

12. The method of claim 11, further comprising determining the DCI feedback from the uplink control channel resource where the DCI feedback is not received in the uplink shared channel resource.

13. The method of claim 11, wherein transmitting the configuration message comprises in part transmitting a part of the configuration as part of the DCI transmitted over the downlink control channel.

14. The method of claim 11, wherein transmitting the configuration message comprises in part transmitting a part of the configuration as part of a second DCI transmitted during a different downlink control channel monitoring occasion.

15. The method of claim 11, wherein the one or more of the uplink control channel resource and the uplink shared channel resource is scheduled for the UE by a second DCI transmitted during a different downlink control channel monitoring occasion.

16. The method of claim 15, further comprising scrambling a cyclic redundancy check (CRC) for the second DCI using a cell radio network temporary identifier (C-RNTI) or a configured scheduling radio network temporary identifier (CS-RNTI) of the UE.

17. The method of claim 11, further comprising determining the multiple downlink control channel monitoring occasions based at least on one or more of a periodicity of configured scheduling for the UE, a downlink control channel monitoring frequency determined from a downlink control channel search space set configuration for the UE, and the configuration.

18. The method of claim 11, wherein the configuration indicates a set of downlink control channel monitoring occasions including the downlink control channel monitoring occasion.

19. The method of claim 18, wherein the configuration indicates the set of downlink control channel monitoring occasions as one or more of each slot; a collection of symbol indices including associated periodicity and offset; each downlink-centric slot; each uplink-centric slot; and one or more downlink control channel monitoring occasions associated with one or more configured downlink control channel search space sets.

20. The method of claim 11, wherein receiving the DCI feedback comprises receiving an indicator of at least one of: whether the DCI is received during the downlink control channel monitoring occasion; and whether the DCI is received during the downlink control channel monitoring occasion and is correctly decoded.

21. The method of claim 11, wherein transmitting the configuration message comprises transmitting the configuration message in one or more of a radio resource control (RRC) message, the DCI, a different DCI, a media access control (MAC) control element (CE), or a non-access stratum (NAS) message.

22. An apparatus for wireless communication, comprising:
a transceiver;
a memory configured to store instructions; and
one or more processors communicatively coupled with the transceiver and the memory, wherein the one or more processors are configured to:
receive, from a network node, a configuration message including a configuration for sending a downlink control information (DCI) feedback for a downlink control channel monitoring occasion, wherein the configuration indicates one or more of an uplink control channel resource and an uplink shared channel resource over which to send the DCI feedback, and wherein the DCI feedback includes one bit that can indicate an acknowledgement (ACK) where DCI is received during the downlink control channel monitoring occasion and a negative-ACK where DCI is not received during the downlink control channel monitoring occasion;
receive, from the network node, a DCI over the downlink control channel during the downlink control channel monitoring occasion;
process the DCI; and
transmit, based on receiving the DCI and processing the DCI, DCI feedback to the network node over the one or more of the uplink control channel resource and the uplink shared channel resource indicated in the configuration, wherein the one or more processors are configured to transmit the DCI feedback in a single uplink shared channel transmission, and wherein the DCI feedback in the single uplink shared channel transmission comprises feedback for DCIs received during multiple downlink control channel monitoring occasions.

23. The apparatus of claim 22, wherein the one or more processors are configured to receive the configuration message at least in part by at least one of receiving a part of the configuration as part of the DCI received over the downlink control channel or receiving another part of the configuration as part of a second DCI received during a different downlink control channel monitoring occasion.

24. The apparatus of claim 22, wherein the one or more of the uplink control channel resource and the uplink shared channel resource is scheduled by a second DCI transmitted during a different downlink control channel monitoring occasion.

25. The apparatus of claim 24, wherein a cyclic redundancy check (CRC) for the second DCI is scrambled using a cell radio network temporary identifier (C-RNTI) or a configured scheduling radio network temporary identifier (CS-RNTI) configured by the network node.

26. An apparatus for wireless communication, comprising:
a transceiver;
a memory configured to store instructions; and
one or more processors communicatively coupled with the transceiver and the memory, wherein the one or more processors are configured to:
transmit, to a user equipment (UE), a configuration message that includes a configuration for sending a downlink control information (DCI) feedback for a downlink control channel monitoring occasion, wherein the configuration indicates one or more of an uplink control channel resource and an uplink shared channel resource over which to send the DCI feedback, and wherein the DCI feedback includes one bit that can indicate an acknowledgement (ACK) where DCI is received by the UE during the downlink control channel monitoring occasion and a negative-ACK where DCI is not received by the UE during the downlink control channel monitoring occasion;

transmit, to the UE, a DCI over the downlink control channel during the downlink control channel monitoring occasion; and receive, from the UE, DCI feedback over the one or more of the uplink control channel resource and the uplink shared channel resource indicated in the configuration, wherein the one or more processors are configured to receive the DCI feedback in a single uplink shared channel transmission by the UE, and wherein the DCI feedback in the single uplink shared channel transmission from the UE comprises feedback for DCIs received during multiple downlink control channel monitoring occasions.

27. The apparatus of claim 26, wherein the one or more processors are further configured determine the DCI feedback from the uplink control channel resource where the DCI feedback is not received in the uplink shared channel resource.

* * * * *